United States Patent [19]

Shinoda et al.

[11] 4,090,208
[45] May 16, 1978

[54] ELECTRONIC EXPOSURE CONTROL APPARATUS FOR CAMERAS

[75] Inventors: Nobuhiko Shinoda, Tokyo; Tadashi Ito, Yokohama; Soichi Nakamoto, Machida; Fumio Ito, Yokohama, all of Japan

[73] Assignee: Canon Kabushiki Kaisha, Tokyo, Japan

[21] Appl. No.: 727,628

[22] Filed: Sep. 28, 1976

Related U.S. Application Data

[63] Continuation of Ser. No. 529,241, Dec. 3, 1974, abandoned.

[30] Foreign Application Priority Data

Dec. 11, 1973 Japan .............................. 48-139786
Dec. 11, 1973 Japan .............................. 48-139787
Dec. 11, 1973 Japan .............................. 48-013978

[51] Int. Cl.² .......................................... G03B 7/08
[52] U.S. Cl. .............................. 354/38; 354/23 D; 354/50; 354/60 R; 354/60 A
[58] Field of Search .................. 354/23 D, 24, 38, 50, 354/51, 60 R, 60 A

[56] References Cited

U.S. PATENT DOCUMENTS

| | | | |
|---|---|---|---|
| 3,703,130 | 11/1972 | Watanabe | 354/23 D |
| 3,824,608 | 7/1974 | Toyoda | 354/23 D |
| 3,842,587 | 10/1974 | Strauss et al. | 354/23 D |

FOREIGN PATENT DOCUMENTS

| | | | |
|---|---|---|---|
| 2,319,167 | 10/1974 | Germany | 354/23 D |
| 2,316,261 | 10/1974 | Germany | 354/23 D |
| 2,242,300 | 3/1974 | Germany | 354/23 D |

*Primary Examiner*—Russell E. Adams
*Attorney, Agent, or Firm*—Toren, McGeady and Stanger

[57] ABSTRACT

In the camera exposure control apparatus disclosed, a light sensor produces a first analog signal corresponding to the brightness of an object to be photographed. This signal is compared to a gradually varying second analog signal. The variation of the second analog signal is discontinued when the first and second signals reach a predetermined relationship and the second analog signal is stored. As the aperture of the camera's diaphragm is varied, the stored signal is compared with an analog signal corresponding to the diaphragm opening to produce a control signal that inhibits aperture variation when the latter compared signals reach a predetermined relationship.

14 Claims, 6 Drawing Figures

ELECTRONIC EXPOSURE CONTROL APPARATUS FOR CAMERAS

This is a continuation of application Ser. No. 529,241, filed Dec. 3, 1974, now abandoned.

BACKGROUND OF THE INVENTION

1. Field of the Invention

The present invention relates to an electronic exposure control apparatus for cameras, which is arranged to effect the determination of the exposure value by a digital circuitary.

2. Description of the Prior Art

Until now as an electronic exposure control apparatus an apparatus in which the exposure quantity to be used at taking photography is stored as digital quantity especially as the number of pulses so as to determine the exposure quantity in accordance with the number of the stored pulses has been proposed for example in the U.S. Pat. No. 3,748,979.

However, in case of this apparatus it has been necessary to provide, beside the counter for storage, a decording counter as well as an exclusive "OR" circuits of the number (S) in accordance with the bit number of said decording counter in order to decode the number of the pulses stored in the counter. Therefore, in the conventional apparatus, it is unavoidable that the wiring should be complicated.

SUMMARY OF THE INVENTION

Therefore, a primary object of the present invention is to provide an electric exposure control apparatus which can overcome the problems confronted with by the prior art, and which is simple in construction and free from temperature variation.

Another object of the present invention is to provide an apparatus in which computation of the exposure amount is done in an analog manner and the analog exposure amount is converted into a digital amount and memorized, and this digital amount is again converted into an analog amount which is added to the comparison means, and in this comparison means the digital amount converted into the analog amount is compared with exposure factors other than the above mentioned factors to control the exposure value such as a diaphragm aperture.

Other purposes of the present invention will be disclosed more clearly from the explanation of the present invention according to the accompanying drawings.

EXPLANATION OF EMBODIMENT

Figure 1:
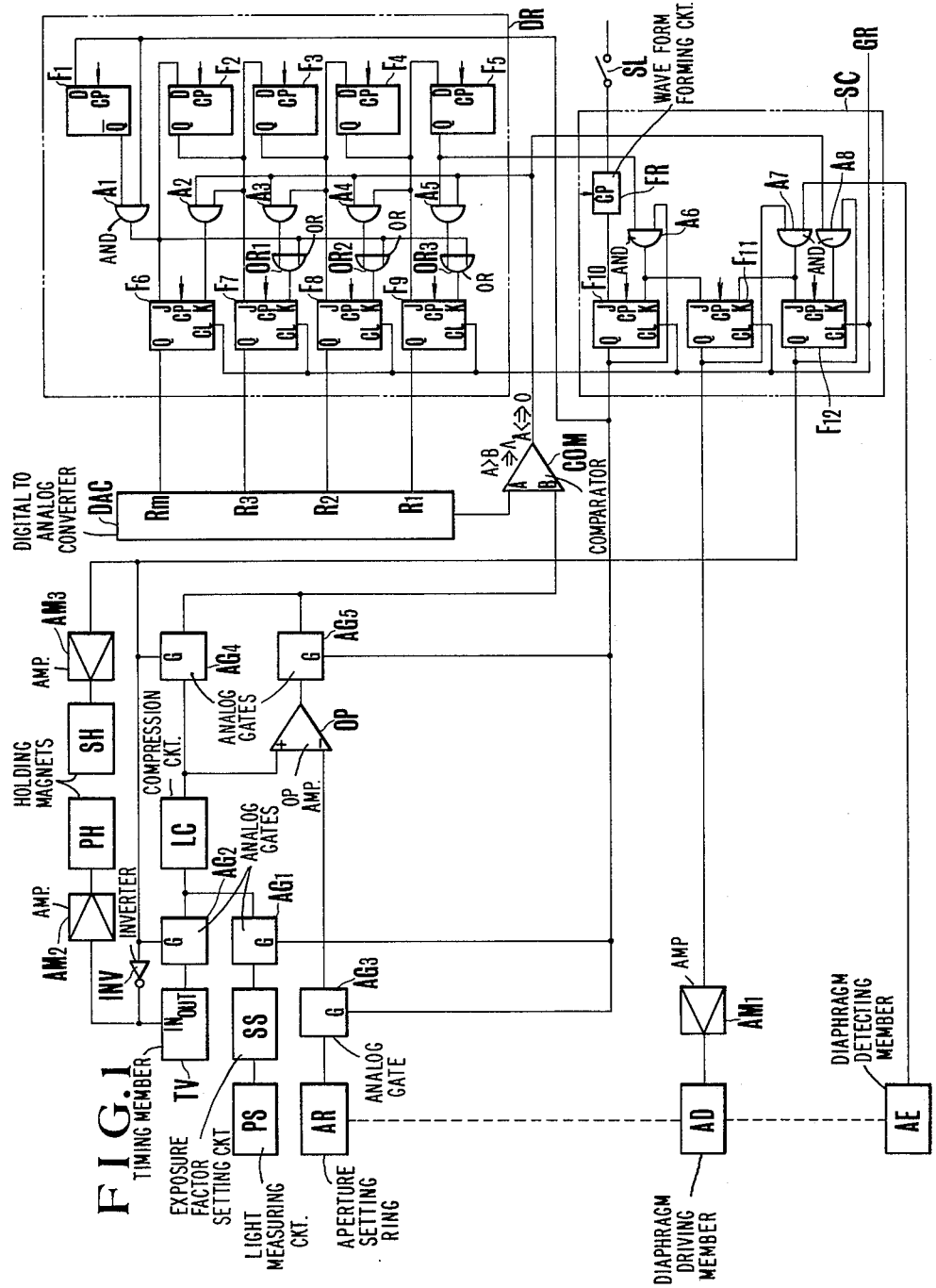
FIG. 1 shows the block diagram of an embodiment of the exposure control apparatus according to the present invention.

FIG. 1 shows the block diagram of an embodiment of the exposure control apparatus according to the present invention, whereby the present invention is applied to a camera of especially TTL system (Through the lens system) in which the exposure time is controlled. PS is a light measuring circuit including a photosensitive element reacting to the light from the object to be photographed so as to give as output the signal of the measured light in accordance with the intensity of the light. SS is an exposure factor setting circuit for correcting the above mentioned signal of the measured light corresponding to the film speed. LC is a logarithmically compressing circuit including for example, a diode for compressing the input logarithmically. AR is an aperture setting ring for setting the diaphragm value and giving as output the Apex information value corresponding to the set diaphragm value. OP is an operational amplifier which receives the output of the above mentioned logarithmically compressing circuit LC with the input terminal at the (+) side and the output of the above mentioned aperture setting ring AR with the input terminal at the (−) side so as to give as output the difference signal of both inputs. AD is a diaphragm driving member for driving the diaphragm from the opened position to the diaphragm value set by means of the above mentioned aperture setting ring AR. AM, is an amplifier for the above mentioned diaphragm driving member AD. AE is a diaphragm driving termination detecting means for giving out as output the high level signal when the diaphragm driving by means of the above mentioned diaphragm driving member AD is terminated. TV is a timing member which is so composed as to give a signal proportional to the elaspe of the time in such a manner that the signal is gradually reduced at a certain determined rate from the time point at which the level of the input terminal IN changed from the high level to the low level, whereby the timing member includes for example, a capacitor. PH is, for example, a magnet for holding the leading curtain of the focal plane shutter from running. $AM_2$ is an amplifier for exciting the above mentioned magnet. SH is a magnet for holding the rear curtain of the focal plane shutter from running. $AM_2$ is an amplifier for exciting the above mentioned magnet. $AG_1$ to $AG_5$ are respectively the analog gate which is controlled by means of the input of the terminal G in such a manner that the gate opens when the input signal enters into the terminal G so as to give the input side information at the output side. COM is a comparator which compares the input at the terminal A with that at the terminal B in such a manner that the output "1" is given when the input at the terminal A is greater than that at the terminal B and that the output "0" is given when the input at the terminal B is greater than that at the terminal A. $F_1$ to $F_5$ are respectively the D-type flip-flop which is set at the same time when the input to the clock CP goes down in case the input at the terminal D is on the high level and reset at the same time when the input to the clock CP goes down in case the input at the terminal D is on the low level. $F_6$ to $F_{12}$ are respectively the J-type flip-flop which is reset at the same time when the input to the clock CP goes down in case the input at the terminal J is on the high level. $A_1$ to $A_3$ are respectively the "AND" gate, while $OR_1$ to $OR_3$ the "OR" gate. INV is an inverter. DAC is a digital to analog converter (D-A converter) which receives the set output of each of the above mentioned flip-flop $F_6$ to $F_8$ with the terminal RM, $R_3$, $R_2$ and $R_1$, whereby the weights "8" "4" "2" and "1" are set on the inputs at the above mentioned terminals in such a manner that the digital quantity set according to the set or reset state of the above mentioned flip-flop $F_6$ to $F_9$ is converted into an analog quantity which is given out as output at the output terminal OUT. SL is the shutter release switch whose contacts are opened when the shutter button is pushed down. FR is the wave form forming circuit which gives out as the clock synchronizing signal the input wave form when the above mentioned shutter release switch SL is switched on and eliminates the bouncing of the shutter release signal due to the mechanical contacts. GR are respectively the general reset terminal which gives the clear reset signal to the clear terminal CL of the above mentioned flip-flop $F_6$ to $F_{12}$ at an optional time before the above mentioned shutter release switch is switched on, for example, within a certain predetermined time after the main switch is closed when the film is wound up because the state of flip-flop is not yet stable when the main switch is closed. SC is the sequence control part which gives the sequence control signal to the apparatus while the flip-flop $F_{10}$ to $F_{12}$ are reset one after another. DR is the digital conversion storage which composes the analog-digital conversion circuitary together with the comparator COM and the D-A converter DAC and stores the converted digital information.

Figure 2:
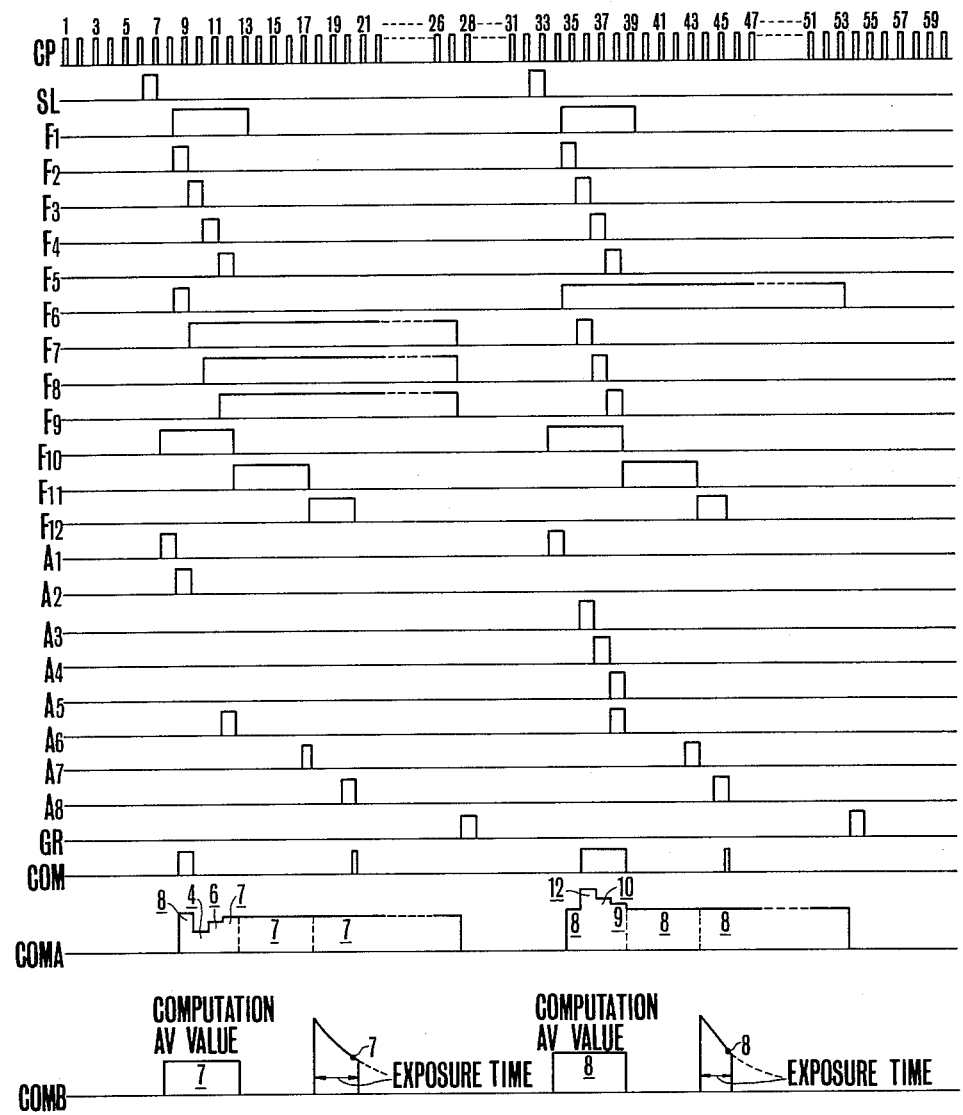
FIG. 2 shows the time chart for explaining the operation of the apparatus shown in FIG. 1.

Below the operation of the apparatus composed as mentioned above will be explained according to the time chart in FIG. 2. In FIG. 2, CP is the clock pulse, SL the output of the wave form forming circuit FR when the shutter is released, $F_1$ to $F_{12}$ respectively the output of the flip-flop $F_1$ to $F_{12}$, $A_1$ to $A_8$ respectively the output of the "AND" gate, COM the output of the comparator COM, COMA the input at the terminal A of the comparator COM namely the output of the D-A converter DAC, COMB the input at the terminal B of the comparator COM and GR the general reset signal. The number put above the clock pulse CP is the number of the clock pulse, the number with underline in the wave form in COMA and COMB the intensity of the analog information.

When the camera in which the exposure control apparatus composed as mentioned above is applied is operated, all of the above mentioned flip-flop $F_6$ to $F_{12}$ are brought in the reset sate, the clear reset signal from the general reset terminal GR being put in the terminals CR of the flip-flop $F_6$ to $F_{12}$ by some preliminary operation such as the film winding up or the switching of the current source.

When then the shutter is released the leading curtain of the focal plane shutter is about to start to run, whereby the magnet PH for holding the leading curtain of the focal plane shutter is controlled by the high level output of the inverter INV, so that the rear curtain of the focal plane shutter also is not in a position to start to run.

Because at the same time with the shutter releasing the shutter release switch SL is closed and the shutter release signal for one clock period which rises up synchronously with the going down of the clock 6 as is shown in FIG. 2 is put in the set input terminal of the flip-flop $F_{10}$ from the wave form forming circuit, the flip-flop $F_{10}$ is set synchronously with the going down of the clock 7 whereby the output at the set side is put in the gate terminal G of the analog gate $AG_1$, $AG_3$ and $AG_5$ and at the same time put in the terminal D of the AND gate $A_1$ and the flip-flop $F_1$.

Thus the analog gates $AG_1$, $AG_3$ and $AG_5$ are opened, the information of the measured light obtained by means of the light measuring circuit PS and the measured light correcting means SS is put in the logarithmically compressing circuit LC through the analog gate $AG_1$ and in the terminal at the (+) side of the operational amplifier OP as the information of the measured light in form of BV (Brightness of the object to be photographed) + SV (Film speed) and the information of the diaphragm value set by means of the aperture setting ring provided on the camera is put in the terminal at (−) side of the operational amplifier through the analog gate $AG_3$, the operational amplifier OP gives an exposure information corresponding to BV + SV − AV, namely the exposure time TV to the terminal B of the comparator COM through the analog gate $AG_5$.

Further by means of the input signal at the terminal D of the flip-flop $F_1$, the flip-flop $F_1$ is set synclonously with the going down of the next clock 8, whereby because the high level output is applied to the "AND" gate $A_1$ from the reset output terminal Q until the flip-flop $F_1$ is set, the above mentioned "AND" gate $A_1$ gives out a high level output for a period of one clock which output is led to the terminal D of the flip-flop $F_2$, the terminal J of the flip-flop $F_6$ and the terminal K of each of the flip-flop $F_7$, $F_8$ and $F_9$ through the "OR" gate $OR_1$, $OR_2$ and $OR_3$. Therefore, at the same time with the going down of the clock 8, the flip-flop $F_2$ and $F_6$ are set while the flip-flop $F_7$, $F_8$ and $F_9$ are brought in the reset state.

Hereby the set output of the flip-flop $F_2$ is put in the terminal D of the flip-flop $F_3$, the set output of the flip-flop $F_3$ in the terminal D of the flip-flop $F_4$ and the set output of the flip-flop $F_4$ in the terminal D of the flip-flop $F_5$, while the flip-flop $F_2$ to $F_5$ give out the time sequence signals synchronously with the clock pulses of the flip-flop $F_2$ to $F_5$.

The flip-flops $F_6$ to $F_9$ consisting J-K type flip-flops compose resistors, whereby the output of the "AND" gate $A_1$ is put in the terminal J of the flip-flop $F_6$ and the set output of the flip-flop $F_2$ is put in the terminal K of the flip-flop $F_6$ through the "AND" gate $A_2$ while the set output of the flip-flop $F_2$ is put in the terminal J of the flip-flop $F_7$ and the set output of the flip-flop $F_3$ is put in the terminal K of the flip-flop $F_7$ through the "AND" gate $A_3$, the set output of the flip-flop $F_3$ is put in the terminal J of the flip-flop $F_8$ and the output of the flip-flop $F_4$ is put in the terminal K of the flip-flop $F_8$ through the "AND" gate $A_4$ and the set output of the flip-flop $F_4$ is put in the terminal J of the flip-flop $F_9$ and the set output of the flip-flop $F_5$ is put in the terminal K of the flip-flop $F_9$ through the "AND" gate $A_5$. Hereby, the outputs of the "AND" gate $A_2$ to $A_5$ are controlled by means of the time sequence signal given by the flip-flop $F_2$ to $F_5$ and the output of the comparator COM. Hereby the set output of the flip-flop $F_6$ has the weight of "8", the set output of the flip-flop $F_7$ the weight of "4", the set output of the flip-flop $F_8$ the weight of "2" and the set output of the flip-flop $F_9$ the weight of "1", whereby the D-A converter DAC gives out the analog conversion information corresponding to "0" to "15" according to the set state of the flip-flop $F_6$ to $F_9$.

Therefore, the output of the flip-flop $F_6$ has the weight of "8" when the flip-flop $F_6$ is in the set state by means of the output of the "AND" gate $A_1$, so that the output of the D-A converter DAC is an analog information corresponding to "8" and put in the terminal A of the comparator COM.

Hereby let us suppose that the input at the terminal B, the value obtained as the result of operation of the value BV (Apex value) + SV obtained from the measured light and the film speed correction and of the diaphragm value (AV) set by means of the aperture setting ring namely BV + SV − AV or TV value (exposure time) be "7". Because at this time, the input at the terminal A of the comparator COM is "8" while the input at the terminal B is "7", the input at the terminal A is greater than the input at the terminal B so that the output of the comparator COM is "1". This output "1" is applied to the "AND" gate $A_2$ to $A_5$ whereby the set output of the flip-flop $F_2$ in the set state is put in the "AND" gate $A_2$ so that the "AND" gate $A_2$ gives out a high level output which is put in the terminal K of the flip-flop $F_6$. Therefore, the flip-flop $F_6$ is reset synchronously with the going down of the next clock 9 while at the same time the set output of the flip-flop $F_2$ is put in the terminal J of the flip-flop $F_7$, so that the flip-flop $F_7$ is set synchronously with the going down of the clock 9. Hereby the set output of the flip-flop $F_7$ has the weight "4" while the flip-flop $F_6$ whose set output has the weight "8" has already been reset so that the output terminal of the D-A converter DAC gives out as output an analog information corresponding to "4" which information is put in the terminal A of the comparator COM. At this time, the output of the comparator COM is "0" because the input at the terminal B is greater than that at the terminal A. Because thus the output of the "AND" gate $A_2$ to $A_3$ is controlled, the set output of the flip-flop $F_3$ in the set state is not applied to the terminal K of the flip-flop $F_7$, so that the flip-flop $F_7$ is held in the set state. Because further the set output of the flip-flop $F_3$ is put in the terminal J of the flip-flop $F_3$, the flip-flop $F_3$ is brought in the set state when the next clock 10 goes down.

Because hereby the output of the flip-flop $F_8$ has the weight of "2" and the flip-flop $F_7$ whose output has the weight "4" is kept in the set state the output terminal OUT of the D-A converter DAC gives out as output the analog information corresponding to "6" ("4" + "2") which information is put in the terminal A of the comparator COM. At this time, the comparator COM gives out the output "0" because the input at the terminal B is still greater than that at the terminal A. Because therefore the output of the "AND" gate $A_2$ to $A_5$ is again controlled the output of the flip-flop $F_4$ in the set state is not applied to the terminal K of the flip-flop $F_8$ so that the flip-flop $F_8$ is held in the set state. Because further the output of the flip-flop $F_4$ is put in the terminal J of the flip-flop $F_9$, the flip-flop $F_9$ is brought in the set state when the next clock 11 goes down. Because hereby the output of the flip-flop $F_9$ has the weight of "1" and the flip-flop $F_7$ whose output has the weight of "4" and the flip-flop $F_8$ whose output has the weight of "2" are kept in the set state, the output terminal OUT of the D-A converter DAC gives out as output the analog information corresponding to "7" ("4" + "2" + "1") which information is put in the terminal A of the comparator COM. At this time, the comparator gives out the output of "0", because the input at the terminal A is equal to that at the terminal B. Because therefore the output of the "AND" gate $A_2$ to $A_5$ is controlled the set output of the flip-flop $F_5$ in the set state when the clock 11 goes down is not applied to the terminal K of the flip-flop $F_9$, so that the flip-flop $F_9$ is kept in the set state.

After the above mentioned processes, the analog information "13" corresponding to the exposure time TV put in the terminal B of the comparator COM is stored as the digital information in the register consisting of the flip-flop $F_6$ to $F_9$.

Further, the output at the set side of the flip-flop $F_5$ is put in the terminal K of the flip-flop $F_{10}$ and in the terminal J of the flip-flop $F_{11}$ in the set state through the "AND" gate $A_6$, so that at the same time with the going down of the next clock 12 the flip-flop $F_{10}$ is brought in the reset state while the flip-flop $F_{11}$ is brought in the set state. The set output of the flip-flop $F_{11}$ is put in the amplifier for driving and the diaphragm driving member drives the diaphragm from the opened position to the set position. At the same time by means of the output of the flip-flop $F_{11}$, the mirror not shown in the drawing goes up. When the diaphragm is driven at least to a position set in advance by means of the aperture setting ring AR, the diaphragm driving termination detecting circuit gives out a high level signal which is put in the "AND" gate $A_7$, which receives the set output of the flip-flop $F_{11}$ in set state. Because, thus the "AND" gate $A_7$ gives out a high level output which is put in the terminal K of the flip-flop $F_{11}$ and in the terminal J of the flip-flop $F_{12}$, the flip-flop $F_{11}$ is reset at the same time with the going down of the clock 17 while at the same time the flip-flop $F_{12}$ is set.

Having being set, the flip-flop $F_{12}$ gives out the high level set output which is put in the terminal G of the analog gates $AG_2$ and $AG_4$ and in the amplifier $AM_3$ for the magnet for holding the rear curtain of the focal plane shutter as well as the low level signal through the inverter INV in the timing circuit TV and in the amplifier $AM_2$ for the magnet PH for holding the leading curtain of the focal plane shutter.

Thus the magnet PH for holding the leading curtain of the focal plane shutter which was energized by the high level signal is deenergized so that the holding of the leading curtain of the focal plane shutter whose running is controlled by the magnet PH for holding the leading curtain of the focal plane shutter is freed so that the leading curtain of the focal plane shutter starts to run while at the same time, the magnet SH for holding the rear curtain of the focal plane shutter is energized so as to control the running of the rear curtain of the focal plane shutter in such a manner that the shutter assumes the opened state. At the same time, the output of the timing circuit TV is reduced from a certain high level value proportionally to the elapse of the time, whereby the value is put in the logarithmically compressing means LC through the analog gate $AG_2$ and put in the terminal 3 of the comparator COM through the analog gate $AG_4$ in the converted form of the analog value corresponding to the logarithmically compressed Apex value.

Hereby, in the terminal A of the comparator COM the analog information corresponding to "7" of the information of the exposure time TV given as the results of the operation in the D-A converter DAC and stored in the register and due to the fact that the output of the timing circuit TV is reduced proportional to the elapse of the time, the input at the terminal B of the comparator COM is reduced from a high value in the logarithmically compressed form, so that at first, the comparator COM gives out the "0" output, whereby when the input at the terminal B of the comparator COM is about to be reduced beyond an analog value corresponding to "7", the comparator COM gives a high level output which is put in the terminal K of the flip-flop $F_{12}$ through the "AND" gate whose one end receives the set output of the flip-flop $F_{12}$ in set state. Thus, at the same time, with the going down of the next clock 20, the flip-flop $F_{12}$ is reset so that the input of the amplifier $AM_3$ of the magnet for holding the rear curtain of the focal plane shutter is reduced to the low level so as to release the operation and the control of the running of the rear curtain of the focal plane shutter. Thus, the rear curtain of the focal plane shutter starts to run so as to close the shutter, so that the exposure time corresponds to the information of the exposure time TV stored in the register because the exposure time is determined by the time information obtained from the actual measurement by means of the timing circuit TV.

At an optional time between the termination of the above operation and the start of the next operation, for example, at the film winding up, the clear reset signal synchronous to the clock is put in the flip-flop $F_6$ to $F_{13}$ from the general reset terminal CR so as to reset the flip-flop $F_6$ to $F_{12}$ again (clock 27).

By means of a series of the above mentioned operations, the proper exposure time for the information of the set diaphragm value is given so as to complete the photographing with the proper exposure. So far the case, the proper exposure time is "7" is explained, whereby in FIG. 2, the operation of the parts in case the proper exposure time obtained from the results of the operation is "8" is shown.

Hereby in case of the first embodiment, the present invention is applied to the camera in which the exposure time is controlled in accordance with the diaphragm value. Below the case the present invention is applied to the camera in which the diaphragm value is controlled in accordance with the shutter speed is explained according to FIGS. 3 and 4. Hereby the explanation for the elements with the same figures is omitted.

Figure 3:
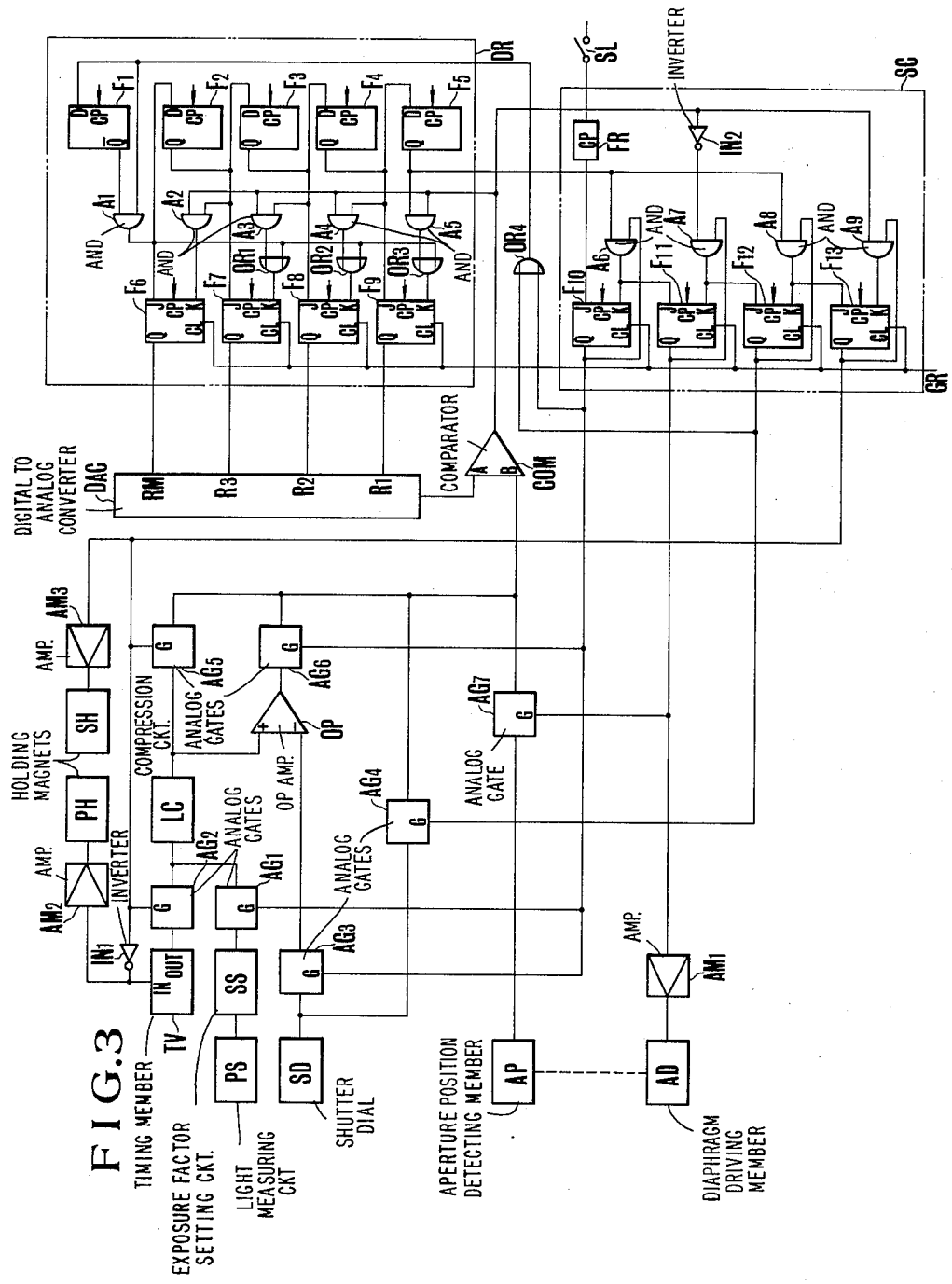
FIG. 3 shows the block diagram of the second embodiment according to the present invention.

In FIG. 3, SD is the shutter dial for setting the exposure time and giving out as output the information value corresponding to the set exposure time. OP is the operational amplifier which receives the output of the logarithmically compressing circuit LG with the input terminal at (+) side, the output of the shutter dial SD with the input terminal at (−) side and gives out as output the differential signal of both inputs. AP is the aperture position detecting member which detects the diaphragm position so as to give out the signal proportional to the diaphragm Apex value. $AG_1$ to $AG_7$ are respectively the analog gate which is controlled by the input in the terminal G in such a manner that when the signal is put in the terminal G, the gate is opened so as to give out the input information as the output at the output side. $F_6$ to $F_{13}$ are respectively the J-K type flip-flop, which is set at the same time when the input at the clock terminal CP goes down in case the input at the terminal J is at high level and reset at the same time when the input at the clock terminal CP goes down in case the input at the terminal K is at high level. $A_1$ to $A_9$ are respectively the "AND" gate. $OR_1$ to $OR_4$ are respectively, the "OR" gate. $IN_1$ and $IN_2$ are inverters. DAC is the digital-analog converter (D-A converter) which receives the set output of the flip-flop $F_6$ to $F_9$ with the terminal RM, $R_3$, $R_2$ and $R_1$, setting the weight "8" "4" "2" and "1" to the input at the terminals and gives out as output at the output terminal OUT the analog quantity converted from the digital quantity set according to the set or reset state of the flip-flop $F_6$ to $F_9$. SC is the sequence control member which give the sequence control signal to the apparatus, setting the flip-flop $F_{10}$ to $F_{13}$ one after another. DR is the digital conversion storage member which composes an analog-digital conversion circuit together with the comparator COM and D-A converter DAC and stores the information converted into the digital quantity.

The operation of the apparatus composed as mentioned above will be explained according to the time chart shown in FIG. 4.

Figure 4:
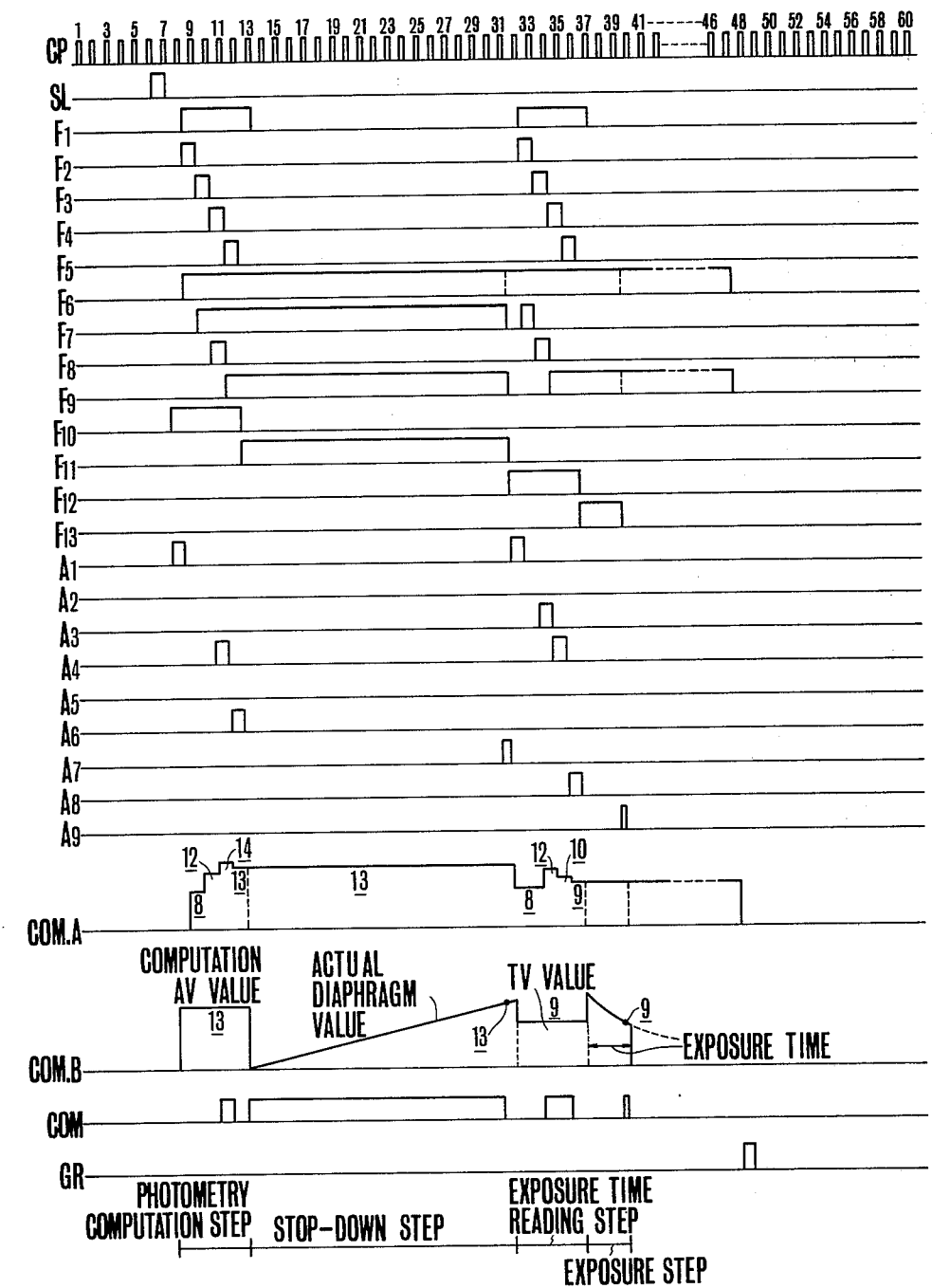
FIG. 4 shows the time chart for explaining the operation of the apparatus shown in FIG. 3.

In FIG. 4, CP is the clock pulse, SL is the output of the wave form forming circuit FR at the time of the shutter release. $F_1$ to $F_{13}$ are respectively the output of the flip-flop $F_1$ to $F_{13}$. $A_1$ to $A_9$ are respectively the output of the "AND" gate $A_1$ to $A_9$. COM is the output of the comparator COM. COMA is the input at the terminal A of the comparator COM, namely the output of the D-A converter DAC. COMB is the input at the terminal B of the comparator. GR is the general reset terminal.

The numbers mentioned above the clock pulses are the number of the clock pulses. The numerical figures with underline in the wave form of COMA and COMB are the intensity of the analog information.

When the camera to which the exposure control apparatus composed as mentioned above is operated, by means of the operation of the film winding up or of the preliminary operation of the switching in of the current source the clear reset signals are put in the terminal CL of the flip-flop $F_6$ to $F_{13}$ from the general reset terminal GR so as to reset all of the above mentioned flip-flop $F_6$ to $F_{13}$.

When then the shutter is released the leading curtain of the focal plane shutter is about to start to run whereby the magnet PH for holding the leading curtain of the focal plane shutter is controlled by means of the high level output of the inverter $IN_1$ so that the rear curtain of the focal plane shutter is also not in a position to start to run.

At the same time, when the shutter is released the shutter release switch SL is closed and the shutter release signal for the one clock period rising up synchronuously to the going down of the clock 6 as is shown in FIG. 4 is put in the set input terminal of the flip-flop $F_{10}$ so that the flip-flop $F_{10}$ is set synchronuously to the going down of the clock 7 whereby the output at the set side is put in the gate terminal G of the analog gate $AG_1$, $AG_3$ and $AG_6$ and further in the "AND" gate $A_1$ and the terminal D of the flip-flop $F_1$ through the "OR" gate $OR_4$.

Thus, the analog gates $AG_1$, $AG_3$ and $AG_6$ are opened, the information of the measured light obtained by means of the light measuring circuit and the measured light correcting means SS is put in the logarithmically compressing circuit LC through the analog gate $AG_1$ and further put in the terminal at (+) side of the operation amplifier OP as the exposure information BV (Brightness of the object) + SV (Film speed) and the shutter time set by means of the shutter dial SD namely the exposure time information TV is put in the terminal at (−) side of the operation amplifier through the analog gate $AG_3$, so that the above mentioned operation amplifier OP gives out as output the exposure information corresponding to BV + SV − TV, namely the diaphragm value AV which information is put in the terminal B of the comparator COM through the analog gate. Hereby the above mentioned diaphragm value is supposed to be "13".

Likely to the process in case of the first embodiment the analog information corresponding to the diaphragm value of "13" put in the terminal B of the comparator COM is stored as digital information in the register consisting of the flip-flop $F_6$ to $F_9$.

The output at the set side of the flip-flop $F_5$ is put in the terminal K of the flip-flop $F_{10}$ and in the terminal J of the flip-flop $F_{11}$ in the set state through the "AND" gate $A_6$, so that at the same time when the next clock 12 goes down the flip-flop $F_{10}$ is brought in the reset state while the flip-flop $F_{11}$ is brought in the set state. The set output of the above mentioned flip-flop $F_{11}$ is put in the terminal G of the analog gate $AG_7$, so as to open the analog gate $AG_7$. At the same time, the set output of the above mentioned flip-flop $F_{11}$ is put in the amplifier $AM_1$ for driving diaphragm so that the diaphragm driving means AD drives the diaphragm from the opened position to the closed position.

Hereby on the diaphragm, a diaphragm position detecting member AP, which gives out as output the information corresponding to the actual diaphragm position, namely the actual diaphragm value is provided and the output of the diaphragm position detecting member AD is put in the terminal B of the comparator COM. By the diaphragm driving operation, the diaphragm position detecting means AP gives out as output the actual diaphragm value being increased gradually as is shown in FIG. 2, namely the $f$ number value while at the terminal A of the comparator COM, the analog information corresponding to "13" of the D-A converter DAC exists so that at the beginning the input at the terminal A of the comparator COM is larger than that at the terminal B and therefore the comparator COM continues to give out as out put "1". When the input at the terminal B is increased gradually above the input at the terminal A, the comparator COM gives out as output "0", which "0" output is inversed by the inverter $IN_2$ into "1" signal and put in the "AND" gate. Because at this time, the set output of the above mentioned flip-flop $F_{11}$ is put in the other input of the above mentioned "AND" gate $A_7$, the gate $A_7$ gives out a high level output which is put in the terminal K of the flip-flop $F_{11}$ and in the terminal J of the flip-flop $F_{12}$. Therefore, at the same time, when the next clock 31 goes down the flip-flop $F_{11}$ is reset while the flip-flop $F_{12}$ is set.

Because, by the resetting of the flip-flop $F_{11}$ the set output does not exist any more the diaphragm driving means AD ceases its operation, so that the diaphragm is kept at the diaphragm value when the diaphragm driving is ceased. The then diaphragm value corresponds to the $f$ number AV stored in the register.

By the setting of the flip-flop $F_{12}$, the set output becomes of high level and is put in the terminal G of the analog gate $AG_4$ and in the "AND" gate $A_1$ and in the terminal D of the flip-flop $F_1$ through the "OR" gate $OR_4$.

Because the analog gate $AG_4$ is opened by means of the high level input in the terminal G, the exposure time information Tv set on the shutter dial SD is put in the terminal B of the comparator COM.

Now, let us suppose that the Tv value be 9. The output at the reset side of the flip-flop $F_1$ is, for one clock period (clock 32), put in the "AND" gate $A_1$ which receives the set output of the flip-flop $F_{12}$, so that the output of the gate $A_1$ is of high level and therefore the flip-flop $F_7$ to $F_9$ which have so far stored the digital value of the diaphragm value Av is reset, only the flip-flop $F_6$ being left in the set state. After then, according to the time sequence signals from the flip-flop $F_2$ to $F_5$ as explained above for the case of the A-D conversion storage of $f$ number Av, the flip-flop $F_6$ to $F_9$ are brought in the set state one after another, the output of the D-A converter DAC is put in the terminal A of the comparator COM which compares the input at the terminal A with that at the terminal B in such a manner after all, the flip-flop $F_6$ having the weight of "8" and the flip-flop $F_9$ having the weight of "1" are kept in the set state while the flip-flop $F_7$, $F_8$ are brought in the reset state and the output terminal OUT of the D-A converter DAC gives out as output the analog information corresponding to "9". Namely, the exposure time value given by the shutter dial SD and Tv value are stored as digital information in the register consisting of the flip-flop $F_6$ to $F_9$.

After the above mentioned processes, at the time point (clock 36) at which Tv information put in at the terminal B of the comparater COM is stored as digital information in the register the flip-flop $F_5$ which determines the time sequence signal is being in the set state whereby the set output of the flip-flop $F_5$ is put in the "AND" gate $A_8$ whose one end receives the set output of the flip-flop $F_{12}$. Because at this time point, the flip-flop $F_{12}$ is being in the set state the output of the "AND" gate $A_8$ is of high level and put in the terminal K of the flip-flop $F_{12}$ and in the terminal J of the flip-flop $F_{13}$ so that at the same time, when the clock 36 goes down the flip-flop $F_{12}$ is reset while the flip-flop $F_{13}$ is set.

The output of the above mentioned flip-flop $F_{13}$ is put in the terminal G of the analog gates $AG_2$ and $AG_3$, the driving amplifier $AM_3$ of the magnet SH for holding the rear curtain of the focal plane shutter and in the timing circuit Tv as the low level and the driving amplifier $AM_2$ of the magnet PH for holding the rear curtain of the focal plane shutter through the inverter $IN_1$.

Thus, the leading curtain of the focal plane shutter which is controlled by the high level signal starts to run because the magnet PH for holding the leading curtain of the focal plane shutter is released while the means SH for holding the rear curtain of the focal plane shutter is energized so as to control the running of the rear curtain of the focal plane shutter so that the shutter remains in the opened state.

At the same time, the output of the timing circuit Tv is reduced gradually in proportion to the time elapse from the high level whereby the value is put in the logarithmically compressing circuit LC through the analog gate $AG_2$ and put in the terminal B of the comparator COM in the logarithmically compressed state through the analog gate $AG_5$.

Hereby, the analog information corresponding to the information of the exposure time "9" given from the D-A converter DAC by the shutter dial and stored in the register is put in the terminal A of the comparator COM and the output of the timing circuit Tv is reduced in proportion to the elapse of the time so that the input at the terminal B of the comparator COM is gradually reduced in the logarithmically compressed form for the high value and therefore, the comparator COM continues to give out "0" output at the beginning, while at the time point at which the input at the terminal B of the comparator COM is about to be reduced beyond the analog value corresponding to "0" the comparator COM gives out a high level output which is put in the terminal K of the flip-flop $F_{13}$ through the "AND" gate $A_9$ whose one end receives the set output of the flip-flop $F_{13}$ in set state.

Therefore, at the same time, when the next clock 39 goes down the flip-flop $F_{13}$ is reset and the input of the driving amplifier $AM_3$ of the magnet SH for holding the rear curtain of the focal plane shutter becomes of low level so that the operation of the magnet SH for holding the rear curtain of the focal plane shutter is control so as to release the running of the rear curtain of the focal plane shutter.

Thus the rear curtain of the focal plane shutter starts to run so as to close the shutter whereby the shutter opening time, namely the exposure time is determined by the actual measurement by means of the timing circuit Tv, assuming after all the same value as is given by the shutter dial SD.

At the optional time between the termination of the above mentioned operation and the start of the next operation for example, at the time of film winding up, the clear reset signal is put in the flip-flop $F_6$ to $F_{13}$ from the general reset terminal GR in such a manner that the flip-flop $F_6$ to $F_{13}$ are brought again in the reset state (clock 47).

The series of the above mentioned operations can be devided in four steps namely, the light measurement and processing step, the diaphragm driving step, the exposure time decoding step and the exposure step as is shown in FIG. 4, whereby the proper diaphragm value for the exposure time information set after these steps is determined so as to complete the photographing with the proper exposure.

In case of the above mentioned embodiment, a common register is used for storing the information of the diaphragm value and the information of the exposure time while the D-A converter as well as the comparator is used for several purposes in the time deviding way, whereby independent means can be provided for each purpose.

According to the above mentioned embodiment, the case of which the exposure time is adjusted after the diaphragm wings (not shown in the drawing) is set to a certain predetermined diaphragm value Av by means of the diaphragm driving member AD is explained whereby it goes without saying that according to the present invention it is also possible to drive the aperture preset ring (not shown in the drawing) by means of the diaphragm driving member AD, then to drive the diaphragm wings up to the diaphragm value Av set by the above mentioned aperture preset ring with the signal put out of the flip-flop 13 and to adjust the exposure time.

Figure 5:
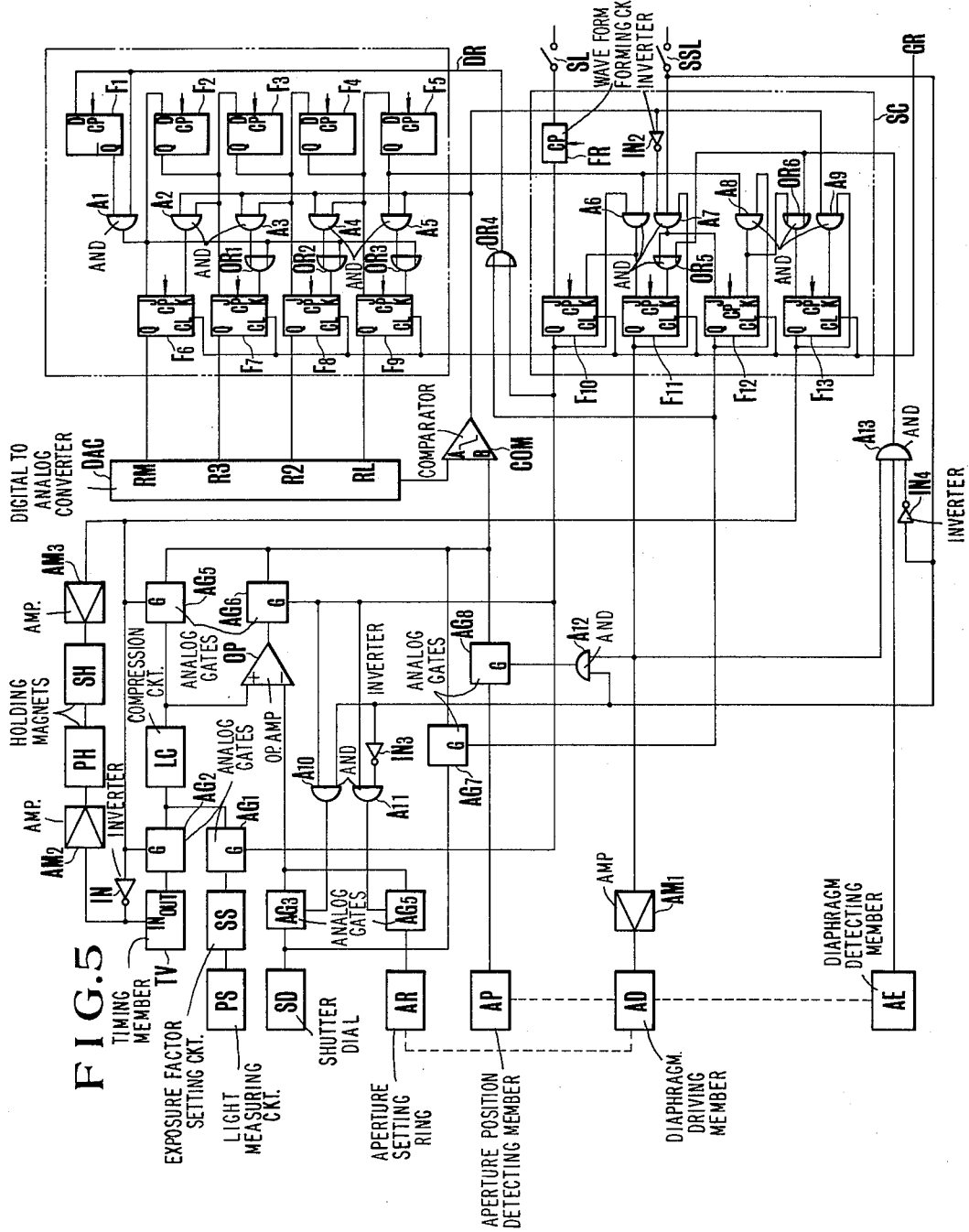
FIG. 5 shows the block diagram of the third embodiment according to the present invention.

Below the third embodiment will be explained according to FIGS. 5 and 6, whereby the same members as those in the first and the second embodiments have the same reference numbers so that the explanations are omitted.

The amplifiers $AG_1$ to $AG_8$ are respectively the analog gates which are controlled by the input at the terminal G in such a manner that the gates are opened when the signal is put in the terminal G, so as to give out the information at the input side as the output at the output side. $A_1$ to $A_{12}$ are "AND" gates. $OR_1$ to $OR_5$ are the "OR" gates. $IN_1$ to $IN_4$ are the inverters. SSL is the shutter selection switch whose contacts is closed when the photography mode is switched over to photography.

The operation of the apparatus composed as mentioned above will be explained below according to the time chart in FIG. 6.

Figure 6:
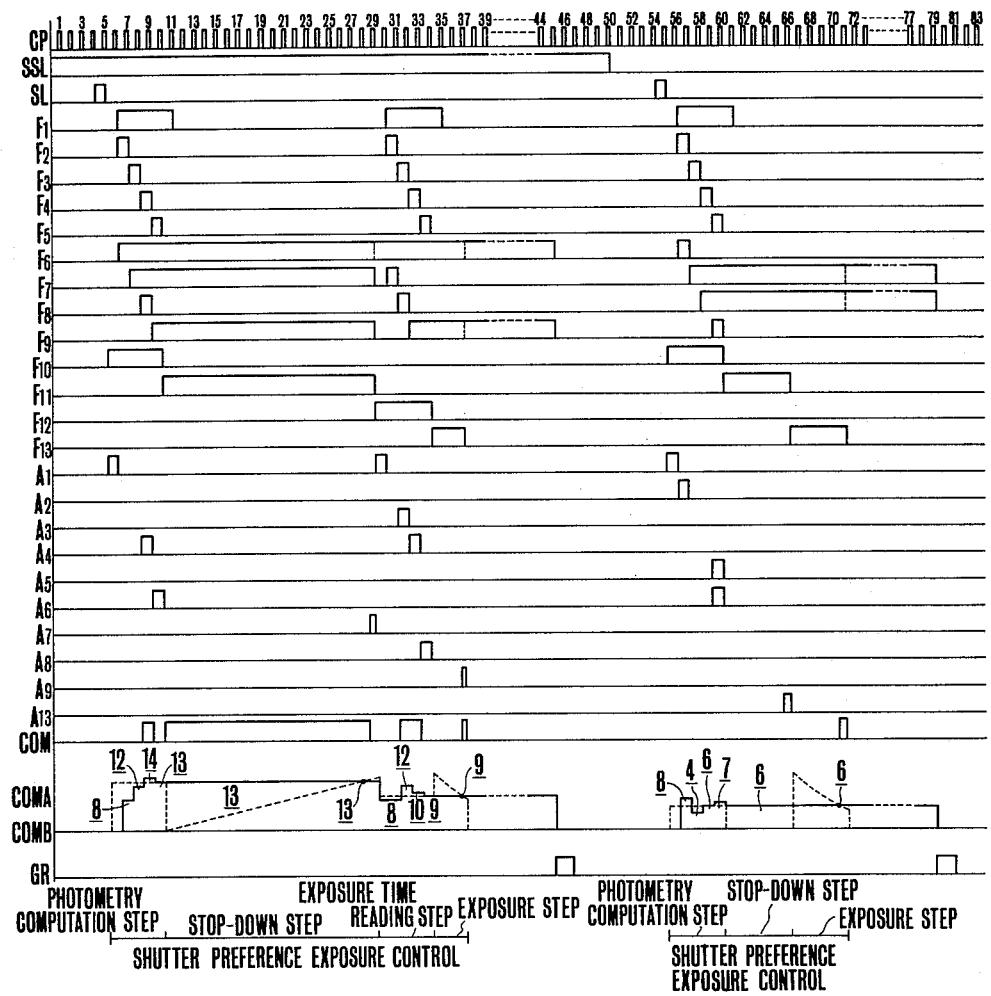
FIG. 6 shows the time chart for explaining the operation of the apparatus shown in FIG. 5.

Hereby in FIG. 6, CP is the clock pulse. SSL is the output of the shutter selection switch. SL is the output of the wave form forming circuit FR when the shutter is released. $F_1$ to $F_{13}$ are respectively the output of the flip-flop $F_1$ to $F_{13}$. $A_1$ to $A_9$ and $A_{13}$ are respectively the output of the "AND" gate $A_1$ to $A_9$ and $A_{13}$. COM is the output of the comparator COM. COMA is the input at the terminal A of the comparator COM, namely the output (in full line) of the D-A converter DAC. COMB is the input (in broken line) at the terminal B of the comparator COM. GR is the general reset signal. The numbers mentioned above the clock pulse CP are the numbers of the clock pulse. The figures with underline in the wave form of COMA and COMB show the intensity of the analog informations.

When the camera to which the exposure control apparatus composed as mentioned above is operated, at first by the operation of the film winding up or the preliminary operation of the switching in the current source the clear reset signal is put in the terminal CL of the flip-flop $F_6$ to $F_{13}$ from the general reset terminal GR so as to reset all of the flip-flop $F_6$ to $F_{13}$.

When then the shutter is released, the leading curtain of the focal plane shutter is about to start to run whereby the means for holding the leading curtain of the focal plane shutter is controlled by the high level output of the inverter $IN_1$ so that the rear rear curtain of the focal plane shutter is also not in a position to start to run.

Below the case whereof the shutter selection switch SSL is in the switched-in state at the time point at which the shutter is released, namely the case whereof the priority is put on the shutter will be explained. At this time, the high level signal is put in each input terminal of the "AND" gates $A_7$, $A_{10}$ and $A_{12}$ from the shutter selection switch SSL while the low level signal is put in each input terminal of the "AND" gates $A_{11}$, $A_{12}$ through the inverters $IN_3$ and $IN_4$.

At the same time, when the shutter is released, the shutter release switch SL is closed and the shutter release signal for one clock period rising up synchronously to the going down of the clock 4 as is shown in FIG. 6 is put in the terminal J of the flip-flop $F_{10}$ from the wave form forming circuit FR so that the flip-flop $F_{10}$ is set synchronously to the rising up of the clock 5 whereby the output at the set side is put in the gate terminal G of each of the analog gate $AG_3$ through the analog gates $AG_1$, $AG_6$ and the "AND" gate $AG_{10}$ and also in the "AND" gate $A_1$ and the terminal D of the flip-flop $F_1$ through the "OR" gate $OR_4$.

Therefore, the analog gates $AG_1$, $AG_3$ and $AG_6$ are opened, the information of the measured light obtained through the light measuring circuit PS and the light measurement correction means SS is put in the logarithmically compressing circuit SL through the analog gate $AG_1$ and in the terminal at (+) side of the operation amplifier OP as the exposure information Bv (Apex value of the brightness of the object) + Sv (Apex value of the film speed) and the shutter time set by the shutter dial SD, namely the exposure time information Tv (Apex value) is put in the terminal at (−) side of the operation amplifier OP through the analog gate $AG_3$, so that the above mentioned operation amplifier OP gives out as output the exposure information corresponding to Bv + Sv − Tv, namely the information of diaphragm value Av (Apex value) which information is put in the terminal B of the comparator COM through the analog gate $AG_6$.

Hereby let us suppose that the input at the terminal B, namely the value (Bv + Sv − Tv) obtained as the result of the operation of the value (Bv + Sv) (Apex value) obtained from the light measurement and the film speed correction and the exposure time Tv (Apex value) set by the shutter dial, namely the diaphragm value Av (Apex value) be "13".

After the processes similar to those explained for the first and the second embodiments, the analog information "13" corresponding to the diaphragm value put in the terminal B of the comparator COM is stored as the digital information in the register consisting of the flip-flop $F_6$ to $F_9$.

Further, the output at the set side of the flip-flop $F_5$ is put in the terminal K of the flip-flop $F_{10}$ and in the terminal J of the flip-flop $F_{11}$ through the "AND" gate $A_6$ to which the output at the set side of the flip-flop $F_{10}$ in the set state is applied so that at the same time when the next clock 10 goes down the flip-flop $F_{10}$ is brought in the reset state while the flip-flop $F_{11}$ is brought in the set state. The set output of the flip-flop $F_1$ is put in the terminal G of the analog gate $AG_8$ through the "AND" gate $A_{12}$ so as to open the analog gate $AG_8$ and also in the amplifier $AM_1$ for diaphragm driving. Therefore, the diaphragm driving member drives the diaphragm from the opened position to the closed position. Further on the diaphragm, the diaphragm position detecting circuit AP is provided so as to give out as output the analog signal (corresponding to Apex value) corresponding to the then diaphragm position, whereby the output of the detecting circuit AP is put in the terminal B of the comparator COM of the analog gate $AG_8$. Hereby the diaphragm position detecting circuit gives out as output the diaphragm value which is gradually increased as is shown in FIG. 2 by the diaphragm driving operation, while the analog information corresponding to "13" is put in the terminal A of the comparator COM from the D-A converter DAC so that at first, the input at the terminal A of the comparator COM is larger than that at the terminal B and therefore, the comparator COM continues to give out "1" output, while when the input at the terminal B is increased above the input at the terminal A, the comparator COM gives out the "0" output which is inversed into "1" signal by the inverter $IN_2$ and put in the "AND" gate $A_7$. At this time, the set output of the flip-flop $F_{11}$ and the high level signal from the shutter selection switch SSL are put in the other input of the "AND" gate $A_7$, so that the "AND" gate $A_7$ gives out a high level output which is input in the terminal K of the flip-flop $F_{11}$ through the "OR" gate $OR_5$ and in the terminal J of the flip-flop $F_{12}$. Therefore, at the same time, when the next clock 29 goes down the flip-flop $F_{11}$ is reset while the flip-flop $F_{12}$ is set. Further, the flip-flop $F_{11}$ is reset so as to cease to give out the set output so that the diaphragm driving member AD ceases also its operation so as to hold the diaphragm at the diaphragm value when the diaphragm driving is ceased. The then diaphragm value is equal to the diaphragm value Av (Apex value) stored in the register (flip-flop $F_6$ to $F_9$).

By the setting of the flip-flop $F_{12}$ the set output becomes of high level and put in the terminal G of the analog gate $AG_7$ and in the "AND" gate $A_1$ through the "OR" gate $OR_4$ and in the terminal D of the flip-flop $F_1$.

Because the analog gate $AG_7$ is opened by the high level input at the terminal G, the information of the exposure time Tv set in the shutter dial SD is put in the terminal B of the comparator COM.

Now, let us suppose that the value of the set exposure time Tv be "9". The output at the reset side of the flip-flop $F_1$ is, for one clock period (clock 30), in the "AND" gate $A_1$ which receives the set output of the flip-flop $F_{12}$ and therefore the "AND" gate $A_1$ gives out the high level output so that the flip-flop $F_7$ to $F_9$, which have so far stored the digital value of the information of the diaphragm value (Av) and only the flip-flop $F_6$ remains in the set state. After then, the flip-flop $F_6$ to $F_9$ are brought in the set state one after another according to the time sequence signal from the flip-flop $F_2$ to $F_5$ as already explained for the case of the A-D conversion storage of the diaphragm value Av in such a manner that the output of the D-A converter DAC is put in the terminal A of the comparator COM so as to compare the input at the terminal A with that at the terminal B, whereby the flip-flop $F_6$ and $F_9$ whose outputs have the weight of "8" and "1" are held in the set state while the flip-flop $F_7$ and $F_8$ are brought in the reset state in such a manner that the D-A converter DAC gives out as output the analog information corresponding to "9" at the output terminal OUT. Namely, the Tv value of the exposure time (Apex value) given by the shutter dial SD is stored in form of digital information in the register consisting of the flip-flop $F_6$ to $F_9$.

At the time point (clock 34) at which the Tv information which is put in the terminal B of the comparator is stored as digital information in the register after the above mentioned processes the flip-flop $F_5$ which determines the time sequence signal has been in the set state, whereby the set output is put in the "AND" gate $A_8$ whose other end receives the set output of the flip-flop $F_{12}$. At this time point the flip-flop $F_{12}$ has been in the set state so that the "AND" gate $A_8$ gives out the high level output which is put in the terminal K of the flip-flop $F_{12}$ and in the terminal J of the flip-flop $F_{13}$ through the "OR" gate $OR_5$ in such a manner that at the same time when the clock 34 goes down the flip-flop $F_{12}$ is reset while the flip-flop $F_{13}$ is set.

The output of the flip-flop $F_{13}$ is put in the terminal G of the analog gates $AG_2$ and $AG_5$ and in the driving amplifier $AM_3$ of the magnet SH for holding the rear curtain of the focal plane shutter and also in the timing circuit Tv and in the driving amplifier $AM_2$ of the magnet PH for holding the leading curtain of the focal plane shutter as low level signal through the inverter $IN_1$.

Thus the magnet PH for holding the leading curtain of the focal plane shutter is released so that the leading curtain of the focal plane shutter having being controlled by the high level signal starts to run while at the same time, the magnet SH for holding the rear curtain of the focal plane shutter is operated so as to control the running of the rear curtain of the focal plane shutter so that the shutter remains in the opened state.

At the same time, the output of the timing circuit Tv is reduced from a certain high level in proportion to the elapse of the time whereby the value of the output is put in the logarithmically compressing circuit LC through the analog gate $AG_2$ and in the terminal B of the comparator COM through the analog gate $AG_5$ in the logarithmically compressed form.

The analog information corresponding to "9" of the information of the exposure time Tv given by the shutter dial SD and stored in the register is put in the terminal A of the comparator from the D-A converter DAC while the output of the timing circuit Tv is reduced in proportion to the elapse of the time and therefore the input at the terminal B of the comparator COM is also reduced from the high value in the logarithmically compressed form, so that at first, the comparator gives out "0" output while at the time point at which the input at the terminal B of the comparator COM is about to be reduced beyond the analog value corresponding to "9" the comparator COM gives out a high level output which is put in the terminal K of the flip-flop $F_{13}$ through the "AND" gate $A_9$, whose another end receives the set output of the flip-flop $F_{13}$ in the set state.

Because, therefore at the same time, when the next clock 37 goes down the flip-flop $F_{13}$ is reset, the input of the driving amplifier $AM_3$ of the magnet SH for holding the rear curtain of the focal plane shutter becomes low level so that the operation of the magnet SH for holding the rear curtain of the focal plane shutter is controlled, so as to release the running of the rear curtain of the focal plane shutter.

Thus, the rear curtain of the focal plane shutter starts to run and the shutter is closed whereby the shutter opening time, namely the exposure time is determined while the measurement is being carried out by means of the timing circuit, whereby the exposure time assumes the same value as is given by means of the shutter dial SD.

At an optical time between the termination of the above mentioned operation and the start of the next operation, for example, at the time of the film winding up the clear reset signal is put in the flip-flop $F_6$ to $F_{13}$ from the general reset terminal GR, so as to bring the flip-flop $F_6$ to $F_{13}$ in the reset state again (clock 45).

The above mentioned series of the operations can be divided in four steps namely, the light measurement operation step, the diaphragm driving step, the exposure time decoding step and the exposure step in such a manner that the proper diaphragm value for exposure time information set up through the above mentioned steps is determined so as to complete the photographing with the proper exposure.

Below the case whereby the shutter selecting switch SSL is in the switched-in state at the time point at which the shutter is released, namely the priority is put on the shutter will be explained. At this time, the shutter selecting switch SSL gives out the low level output and therefore the high level signal is put in the input terminal of the "AND" gate $A_{11}$ and $A_{13}$ through the inverter $IN_3$ and $IN_4$ while the low level signal is put in the input terminal of the "AND" gate $A_7$, $A_{10}$ and $A_{12}$.

At the same time, when the shutter is released the shutter release switch SL is closed and the shutter release signal is put in the set input terminal of the flip-flop $F_{10}$ for one clock period rising us synchromously to the going down of the clock from the wave form forming circuit FR as is shown in FIG. 6 so that the flip-flop $F_{10}$ is set synchronously to the going down to the clock 56, whereby the output at the set side is put in the gate terminal G of the analog gate $AG_1$, $AG_6$ and $AG_{11}$ and also in the "AND" gate $A_1$ and the flip-flop $F_1$.

Hereby let us suppose that the input at the terminal B, namely the value (Bv + SV 31 Av) obtained as the operation result of the Bv + Sv (Apex value) and the aperture value Av set by the aperture setting ring, namely Tv value (exposure time) by "6".

After the above mentioned processes, the analog information "6" corresponding to the exposure time Tv put in the terminal B of the comparator COM is stored as digital information in the register consisting of the flip-flops $F_6$ to $F_9$.

Hereby the output of the set side of the flip-flop $F_5$ is put in the terminal K of the flip-flop $F_{10}$ in set state and in the terminal J of the flip-flop $F_{11}$ through the "AND" gate $A_6$, so that at the same time, when the next clock 60 goes down the flip-flop $F_{10}$ is brought in the reset state while the flip-flop $F_{11}$ is brought in the set state. The set output of the flip-flop $F_{11}$ is put in the amplifier $AM_1$ for diaphragm driving, so that the diaphragm driving member AD drives the diaphragm from the opened position to the set position. When the diaphragm is driven at least up to the diaphragm position set in advance by the aperture setting ring AR the diaphragm driving termination detecting means AE gives out a high level signal which is put in the "AND" gate $A_{13}$, whose another end receives the set output of the flip-flop $F_{11}$ is set state and the output inversed by the inverter $IN_4$ from the shutter selecting switch SSL. Thus, the above mentioned "AND" gate $A_{13}$ gives out a high level output which is put in the terminal K of the above mentioned flip-flop $F_{11}$ through the "OR" gate $OR_5$ and in the terminal J of the flip-flop $F_{13}$ through the "OR" gate $OR_6$, so that at the same time, when the clock 66 goes down the flip-flop $F_{11}$ is reset while the flip-flop $F_{13}$ is set.

The flip-flop $F_{13}$ being set, the set output is of high level and put in the terminal G of the analog gate $AG_2$, $AG_5$ and in the driving amplifier $AM_3$ of the magnet SH for holding the rear curtain of the focal plane shutter and also in the timing circuit Tv and in the driving amplifier $AM_2$ of the magnet PH for holding the leading curtain of the focal plane shutter as low level signal through the inverter $IN_1$.

Therefore, the operation of the means PH for holding the leading curtain of the focal plane shutter having so far been driven by the high level signal is released so that the leading curtain of the focal plane shutter starts to run while the magnet SH for holding the rear curtain of the focal plane shutter is operated so as to control the running of the rear curtain of the focal plane shutter so that the shutter is brought in the open state.

At the same time, the output of the timing circuit Tv is reduced proportionally to elapse of the time from a certain high level value whereby the value is put in the logarithmically compressing circuit through the analog gate $AG_2$ and in the terminal B of the comparator COM through the analog gate $AG_5$ in analog value corresponding to the logarithmically compressed Apex value.

The analog information given as the operation result from the D-A converter DAC and corresponding to the "7" of the information of the exposure time Tv stored in the register as digital information and the output of the above mentioned timing circuit Tv is reduced proportional to the elapse of the time and therefore the input at the terminal B of the comparator COM is reduced from a high value in logarithmically compressed form so that at the beginning the comparator COM gives out the "0" output, while at the time point at which the input at the terminal B of the above mentioned comparator COM is reduced beyond the analog value corresponding to "7" the comparator gives out the high level output which is put in the terminal K of the flip-flop $F_{12}$ through the "AND" gate $A_9$ whose another end receives the set output of the flip-flop $F_{13}$ in the set state. Therefore, at the same time, when the next clock 71 goes down the above mentioned flip-flop $F_{13}$ is reset so that the input to the driving amplifier $AM_3$ of the magnet SH for holding the rear curtain of the focal plane shutter goes down to the low level in such a manner that the operation of the magnet SH for holding the rear curtain of the focal plane shutter is released and the rear curtain of the focal plane shutter starts to run. Thus, the shutter is closed, whereby the shutter opening time, namely the exposure time is determined by the time information obtained from the actual measurement by means of the timing circuit and therefore corresponds to the information of the exposure time Tv stored in the register.

At an optional time between the termination of the above mentioned operation and the start of the next operation, for example, at the time of film winding up, the clear reset signal is put in the flip-flop $F_6$ to $F_{13}$ from the general reset terminal GR so as to bring the flip-flops $F_6$ to $F_{13}$ in the reset state again (clock 79).

From the above mentioned series of the operation, the proper exposure time for the information of the set diaphragm value is obtained so as to complete the photographing with the proper exposure.

The above mentioned series of the operations can be devided in three steps, namely the light measurement operation step, the diaphragm driving step and the exposure step as is shown in FIG. 6, whereby the proper exposure time for the set diaphragm value is determined so as to complete the photographing with the proper exposure.

As explained above, according to the present explanation without using the exclusive OR circuit as the coincidence detecting circuit the comparator COM which is used for storing the exposure quantity is used also as the coincidence detecting circuit so that the circuit can be composed quite simple.

Further, according to the present invention, the information of the exposure time necessary for the control of the exposure operation, the information of diaphragm, the information of the shutter time value and so on are treated in analog quantity so that the transmission system can be composed quite simple and especially the signal route can be treated with two terminals, so that the circuit can be composed quite simple. Further the anti-noise characteristics can be improve by adopting integrating elements composing the analog circuit so that the exposure control apparatus with high fidelity can be obtained.

What is claimed is:

1. An electronic exposure control apparatus for a camera having a diaphragm comprising:
   (a) light sensitive means for producing a first analog signal corresponding to the brightness of an object to be photographed;
   (b) signal forming means for producing a gradually varying second analog signal;
   (c) comparison means having a first terminal for receiving the first analog signal and a second terminal for receiving the second analog signal, said comparison means comparing the first analog signal with the second analog signal and producing a first control signal when the first and second analog signals reach a predetermined relationship;
   (d) first gate means connected with the comparison means and the signal forming means for discontinuing the variation of the second analog signal in said signal forming means when said comparator means applies the first control signal to the first gate means so as to store the second analog signal in said signal forming means;
   (e) diaphragm control means for controlling the aperture of the diaphragm means;
   (f) detecting means coupled to the diaphragm means for detecting the aperture size and producing a third analog signal corresponding to the aperture size;
   (g) selector means for alternately coupling the light sensitive means and the detecting means with the first terminal of said comparison means so that said comparison means compares the third analog signal with the second analog signal stored in the signal forming means when the selector means couples the detecting means to the first terminal and produces a second control signal when said two signals reach a predetermined relationship, and
   (h) second gate means connected with the comparison means and the diaphragm control means for inhibiting operation of said diaphragm control means when the second control signal is applied to said second gate means.

2. An electronic exposure control apparatus according to claim 1, further comprising means connected with the light sensitive means for regulating the first analog signal in response to variation in film speed of a camera.

3. An electronic exposure control apparatus according to claim 1, further comprising a means connected with the light sensitive means for regulating the first analog signal in response to variation in the film speed and the shutter speed of the camera.

4. An electronic exposure control apparatus according to claim 1, wherein said signal forming means includes pulse generating means for producing pulses at a given rate, counter means coupled to the pulse generating means for counting pulses, and converter means for producing the second analog signal in response to the content stored in said counter means.

5. An electronic exposure apparatus according to claim 1, wherein said first gate means includes AND gates having at least one input terminal respectively connected with the comparison means.

6. An electronic exposure control apparatus according to claim 1, wherein said second gate means includes a first analog gate for transferring the first analog signal and a second analog gate for transferring the third analog signal when the first control signal from said comparison means is applied to the second analog gate.

7. An electric shutter control apparatus comprising:
   (a) photoelectric means for converting the intensity of light into a first analog signal;
   (b) signal forming means for producing a gradually second analog signal;
   (c) comparison means having a first terminal for receiving the first analog signal and a second terminal for receiving the second analog signal, said comparison means comparing the first analog signal with the second analog signal and producing a first control signal when the first and second analog signals reach a predetermined relationship;
   (d) first gate means connected with the comparison means and the signal forming means for discontinuing the variation of the second analog signal in said signal forming means when said comparator means applies the first control signal to the first gate means so as to store the second analog signal in said signal forming means;
   (e) second signal forming means for producing a gradually variable third analog signal;
   (f) selector means for alternately coupling the photoelectric means the second signal forming means with the first terminal of said comparator means so that said comparison means compares the third analog singal from the second signal forming means with the second analog signal stored in the first signal forming means when the sector means couples the second signal forming means to the first terminal and produces a second control signal when said two signals reach a predetermined relationship, and (g) a shutter closing means for starting a shutter closing operation in response to the second control signal from said comparison means.

8. An electric shutter control apparatus according to claim 7, wherein said shutter closing means includes an electromagnet.

9. An electric shutter control apparatus according to claim 7, further comprising a means connected with said photoelectric means for regulating said first analog signal corresponding to the preselected aperture size of the camera.

10. An electric shutter control system comprising:
(a) photoelectric means for converting the intensity of light into a first analog signal;
(b) pulse generator;
(c) counter means for counting the pulses from said pulse generator;
(d) converter means for producing a second analog signal which represents the value stored in said counter means;
(e) comparison means having a first terminal for receiving the first analog signal and a second terminal for receiving the second analog signal, said comparison means comparing the first analog signal with the second analog signal and producing a first control signal when the first and second analog signals have reached a predetermined relationship;
(f) first gate means connected with the comparison means and the counter means for stopping the variation in the value stored in said counter means when the first control signal is applied to the first gate means;
(g) second signal forming means for producing a gradually variable third analog signal;
(h) selector means for alternately coupling the photoelectric means and the second signal forming means to said comparison means at the first terminal thereof so that said comparison means compares the third analog signal with the second analog signal stored in the converter means when the selector means coupled the second signal forming means to the first terminal and produces a second control signal when said two signals reach a predetermined relationship, and
(i) a shutter closing means for starting the shutter closing operation in response to the second control signal from said comparison means.

11. An electric shutter control system according to claim 10, further comprising means connected with said photoelectric means for regulating said first analog signal corresponding to variation in the preselected film speed of the camera.

12. An electric shutter control system according to claim 10, further comprising means connected with said photoelectric means for regulating said first analog signal correspond to variations in the preselected objective lens aperture opening of the camera.

13. An electric shutter control system according to claim 10, wherein said shutter closing means includes an electromagnet.

14. An automatic exposure control system comprising:
(a) light sensitive means for producing a first electrical signal corresponding to the intensity of light incident thereupon;
(b) signal forming means for producing a gradually varying second electrical signal;
(c) comparison means having a first terminal for receiving the first electrical signal, a second terminal for receiving the second electrical signal and an output terminal, said comparison means effecting to compare the first electrical signal with the second electrical signal and to produce a first control signal from its output terminal when the first and second electrical signals reach a predetermined relationship;
(d) first gate means connected with the comparison means the signal forming means for discontinuing the variation of the second analog signal in said signal forming means when said comparator means applies the first control signal to the first gate means so as to store the second analog signal in said signal forming means;
(e) second signal forming means for producing a gradually variable third electrical signal;
(f) selector means for alternately coupling the light sensitive means and the second signal forming means with the first terminal of said comparison means so that said comparison means compares the third electrical signal from the second signal forming means with the second electrical signal stored in the first signal forming means when the selector means couples the second signal forming means to the first terminal and produces a second control signal from the output terminal of said comparison means when the third electrical signal and the second electrical signal reach a predetermined relationship, and
(g) control means for starting the exposure terminating operation in a camera when the second control signal from said comparison is applied to the control means.

* * * * *

UNITED STATES PATENT OFFICE
CERTIFICATE OF CORRECTION

Patent No. 4,090,208                Dated May 16, 1978

Inventor(s) NOBUHIKO SHINODA, TADASHI ITO, et al

It is certified that error appears in the above-identified patent and that said Letters Patent are hereby corrected as shown below:

In the heading of the patent [30] should read as follows:

[30] Foreign Application Priority Data

Dec. 11, 1973   Japan............48-139786
    Dec. 11, 1973   Japan............48-139787
    Dec. 11, 1973   Japan............48-139788

Signed and Sealed this

Nineteenth Day of September 1978

[SEAL]

Attest:

RUTH C. MASON
*Attesting Officer*

DONALD W. BANNER
*Commissioner of Patents and Trademarks*